(No Model.)  
3 Sheets—Sheet 2.
B. C. SEATON.
ELECTRICAL RAILWAY SIGNAL.
No. 503,100.  
Patented Aug. 8, 1893.
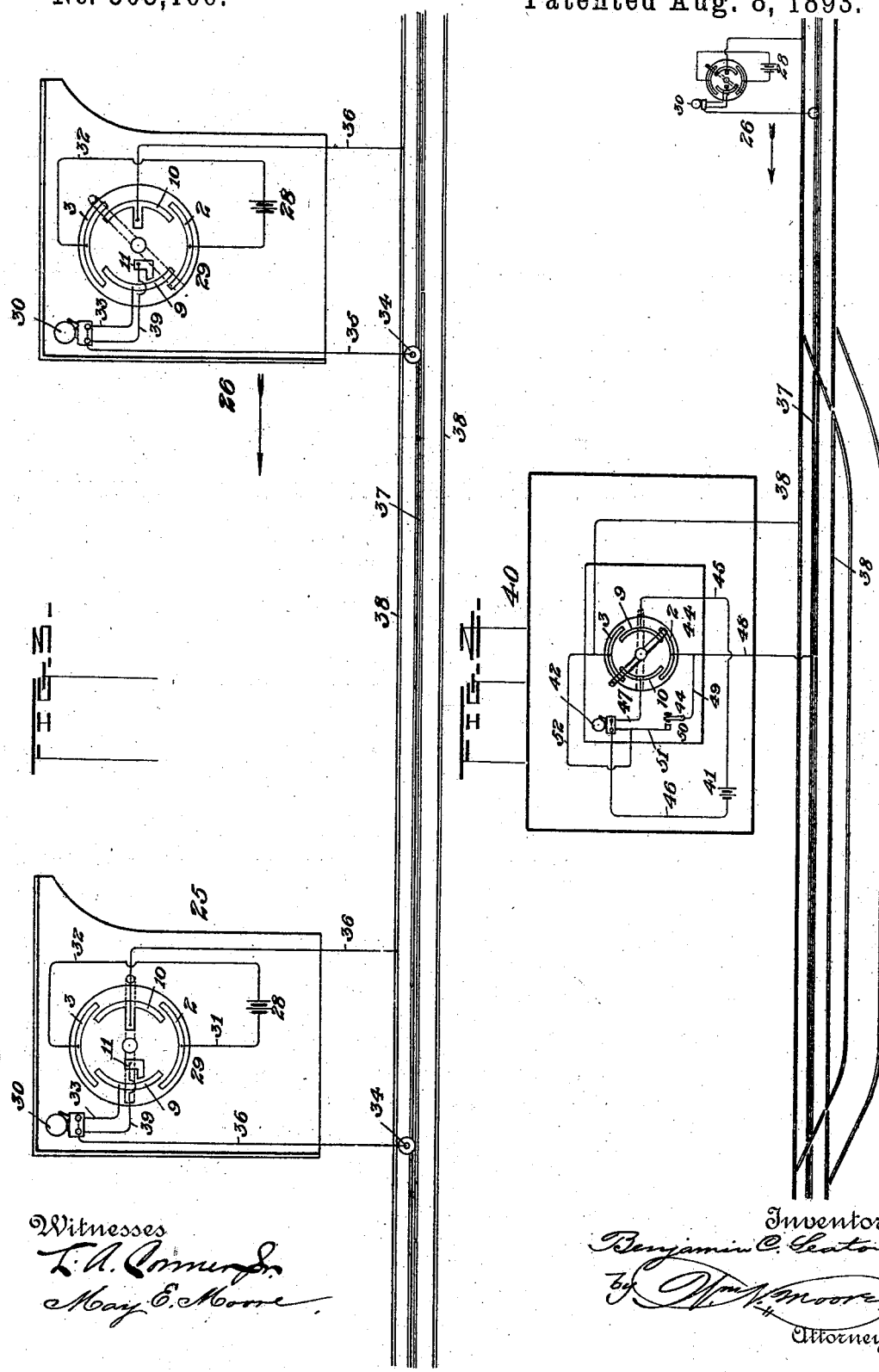
Witnesses  
Inventor  
Benjamin C. Seaton,  
by Wm. K. Moore  
Attorney (No Model.) 3 Sheets—Sheet 3.
B. C. SEATON.
ELECTRICAL RAILWAY SIGNAL.
No. 503,100. Patented Aug. 8, 1893.
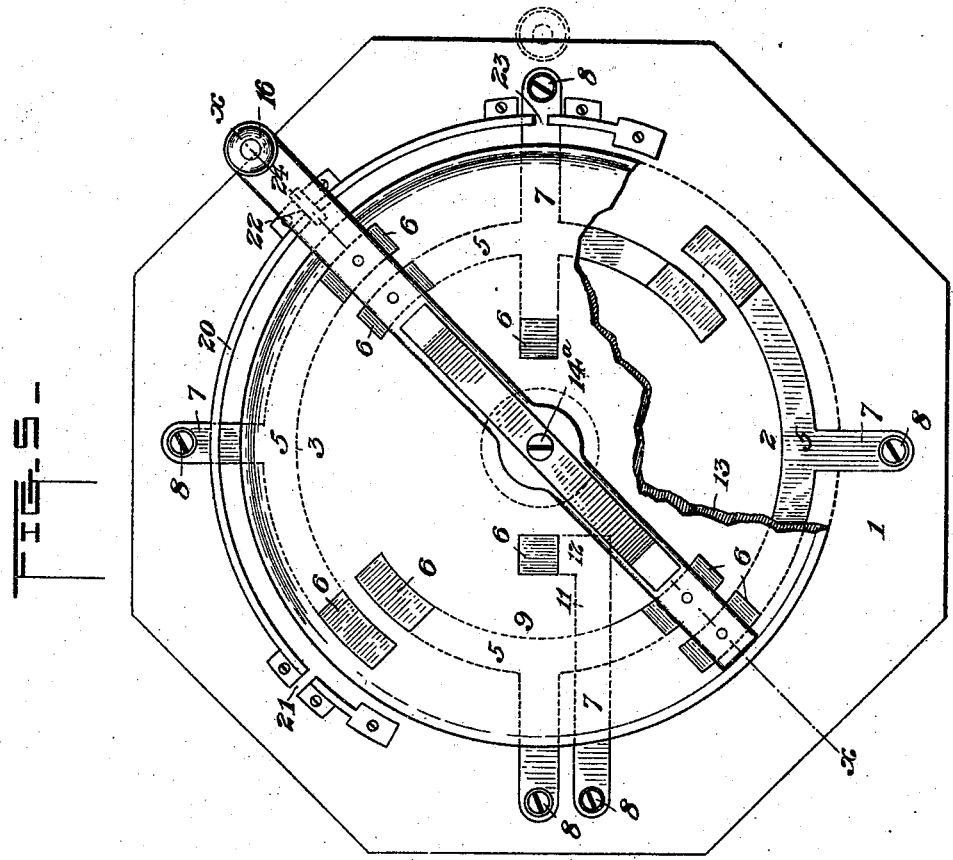
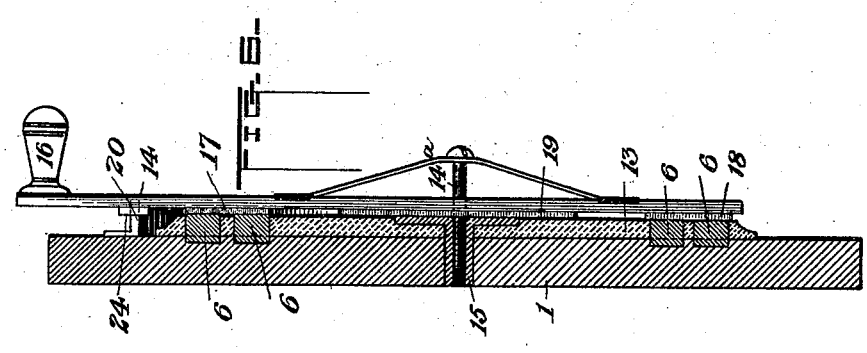
Witnesses
Inventor
Benjamin C. Seaton
by Wm. F. Moore
Attorney

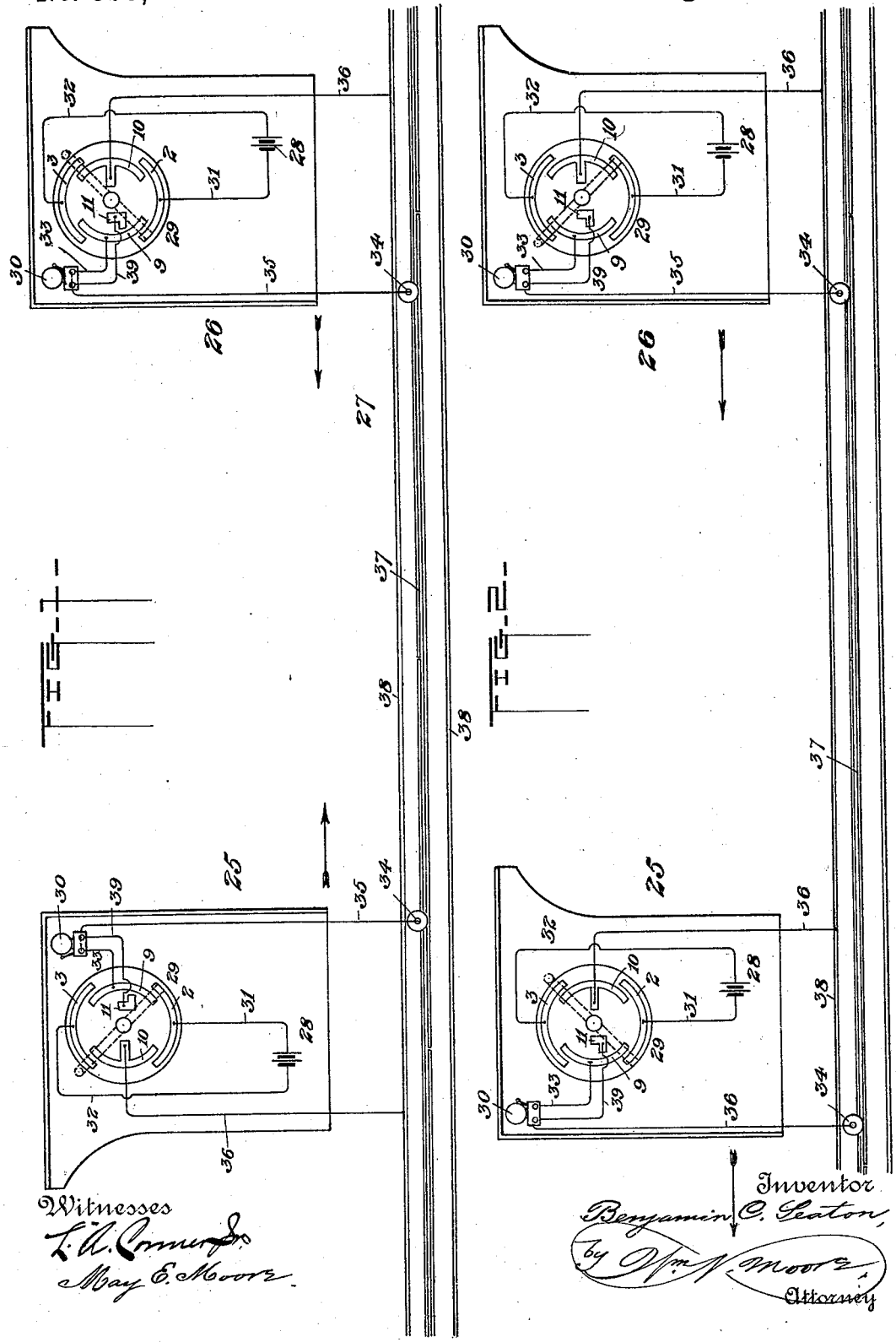

UNITED STATES PATENT OFFICE.

BENJAMIN C. SEATON, OF NASHVILLE, TENNESSEE.

ELECTRICAL RAILWAY-SIGNAL.

SPECIFICATION forming part of Letters Patent No. 503,100, dated August 8, 1893.

Application filed March 2, 1893. Serial No. 464,312. (No model.)

*To all whom it may concern:*

Be it known that I, BENJAMIN C. SEATON, a citizen of the United States, residing at Nashville, in the county of Davidson and State of Tennessee, have invented certain new and useful Improvements in Electrical Railway-Signals; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an automatic block signal system for railways, and is in the nature of an improvement on the system forming the subject-matter of my prior Patent No. 484,614, dated October 18, 1892, to which reference may be had for a more complete and detailed description of the general features and fundamental principles of the invention.

By this particular improvement, I contemplate securing greater efficiency and reliability of operation.

Moreover, this invention has for its object to provide a system of this class which will be wide in its scope and field of adaptability; practically operative and reliable under all conditions, no matter how seemingly adverse; and inexpensive in installation and subsequent maintenance.

For the attainment of these objects, and for other purposes hereinafter enumerated, my improvement comprises, in brief, a certain organization of apparatus and electro-mechanical devices arranged and combined to operate in a prescribed manner, and more fully described hereinafter.

The novel features of my invention are embraced in the appended claims, which are intended to accord in scope and meaning with the prior state of the art, and the existing law.

In the accompanying drawings, I have shown certain details of construction which I deem adequate for carrying out my invention successfully in practice; however, I desire to here state and emphasize that I am not confined strictly to the exact features illustrated and described, since it is manifest that numerous changes and deviations may be made without in the least departing from the spirit and scope of the invention as defined and set forth in the aforesaid claims.

Referring to the drawings forming a part of this specification:—Figure 1 is a conventional or diagrammatical representation of a block or section of track with two locomotives approaching each other thereon, and equipped, respectively, with an electric battery, annunciating bell, controlling switch, and electrically connected with each other and with the track in such manner that the annunciators in both cabs are ringing to notify the engineers of the dangerous presence of another train. Fig. 2 is a similar view showing two trains similarly located and equipped and traveling on the same block or section in the same direction. Fig. 3 is a similar view illustrating the two locomotives or trains on a common block, one being stationary and having its switch so adjusted that the bell in the moving engine will be rung through the circuit including the stationary engine without ringing the annunciator in the stationary engine. Fig. 4 is a diagram showing a station at the end of a track block or section and equipped with a bell, electric battery, and controlling switch, and connected with the track circuit so that the station bell is rung when a train enters the station block, whereby the operator at the station can then cut his bell out and signal the approaching train for any desired purpose or to give any desired order or information in accordance with a prescribed code of signals. Fig. 5 is a detail top plan view of my improved pole-changing multiple contact switch, the top-plate being broken away on one side to disclose the underneath construction and arrangement. Fig. 6 is a transverse central section on the line $x$—$x$ of Fig. 5; and Fig. 7 is an inverted plan or bottom view of the switch-lever.

In all the views of the drawings, like numerals of reference mark the same or corresponding parts.

Before proceeding to describe in detail the apparatus illustrated in the diagrams, it will be first necessary to understand the construction and operation of the controlling switch shown in Figs. 5, 6, and 7. Accordingly, 1, designates an octagonal base plate formed of some suitable durable insulating material, such as wood, hard-rubber, or porcelain, and is of the required dimensions to hold and support the incumbent parts. On the upper side of the base-plate, 1, are secured the contact-plates of the switch which are adapted to be engaged and bridged by the contacts carried on the under side of the movable switch-lever which, in turn, is pivoted centrally to the base-plate and swings around in the arc of a circle described from its pivotal support. The two contact-plates, 2, 3, are situated diametrically opposite each other at equal distances from the center, 4, of the circle and are severally fastened by screws or otherwise to the base-plate. Each contact-plate 2 or 3 consists of an arc-shaped member, 5, terminating at each extremity in an upwardly projecting rectangular lug, 6, and a straight central stem, 7, intersecting the member, 5, at right angles and extending rearwardly from the member, 5, a short distance and provided with a terminal screw-orifice through which passes a binding-screw, 8, by which the contact-plate is fastened to its support. Each plate, 2, or, 3, is made in a single piece of non-oxidizable metal, such as phospho - bronze, aluminum-bronze, or silicon-bronze, and has two contacting-terminals, 6, 6, adapted to be engaged by the bridge-contacts of the lever, as hereinafter described. Thus, it will be understood, that the circle described from the center, 4, and including the arc-shaped member of one contact plate, 2, will also include the opposite arc-shaped member of the other plate, 3.

9, 10, respectively indicate another pair of contact-plates having their stems in a common diametrical line intersecting the diametrical line of the stems of the other set of contacts at right angles. These two contacts, 9, 10 are exactly similar in construction and arrangement as the contact-plates, 2, 3, except that the contact-plate, 10, has its stem, 7, extended inwardly past the member, 5, terminating in an upwardly projecting lug, 6, lying in the same vertical plane as its stem but in a higher horizontal plane, as will be clearly apparent.

In proximity to the contact-plate, 9, is another contact-plate, 11, L-shaped in outline and comprising a stem, 7, parallel to the adjacent stem of the contact-plate, 9, and a member, 12, bent at right-angles to the stem and terminating in an upwardly projecting lug, 6, lying in a common horizontal and vertical plane with the contact-lug on the inward extension of the contact-plate 10.

The adjacent ends of the members, 5, of the contact-plates 2 and 3 overlap the adjacent though separated ends of the contact-plates 9 and 10 a slight distance so as to bring the adjacent lugs, 6, carried by the respective members into radial or axial alignment whereby the bridge-contacts of the lever will engage and span the two adjacent lugs when the lever is moved into that particular position.

All the contact-plates secured to the base or bed-plate are embedded in and protected by an insulating disk, 13, having openings corresponding in shape and location to the contact-plates cut there-through, so that the said disk, 13, can be readily slipped in position over the contact-plates and there fastened in place with the upwardly projecting lugs 6, 6, of the several plates projecting slightly above the upper surface of the disk whereby they may be engaged in a common horizontal plane by the bridge-contacts of the switch-lever.

The switch-lever, 14, is a straight-bar of some strong insulating material, and is centrally pivoted to the pivot-pin, $14^a$, which, in turn, is journaled loosely in the bushing, 15, set in the insulating disk, 13, and passing clear through the disk, 13, and bed-plate, 1. On the extreme outer end of the lever is secured a knob or handle, 16, and on the under side are arranged the bridging contact plates, 17, 18 and 19. The two contact-plates 17 and 18 are fastened to the lever at equal distances from the pivotal support and are each formed of a rectangular strip of conducting metal sufficiently long to bridge the two separated contact lugs, 6, of the two sets of contact plates of the base when the switch is swung around into the position shown in Fig. 6 or in an opposite position. The contact - plate, 19 is simply a rectangular strip of metal fastened to the center of the lever and long enough to engage simultaneously both lugs, 6, of the extended stem of the contact-plate, 10, and the contact-plate, 11.

20 indicates a semi-circular keeper-plate attached to the bed-plate, 1, exteriorly of the contact-plates, and provided with the recesses, 21, 22, and 23 which are designed to receive and hold the lug, 24, secured on the under side of the switch-lever and adapted to slip down into the said recesses and hold the lever in a set position when the lever is moved to bring the lug into registration with a corresponding recess. This keeper-plate is made in three sections screwed down to the base and projecting up vertically to form a frictional riding surface for the lug, 24 on the under side of the lever.

Having now described in detail the construction of the pole-changing and short-circuiting switch, it is now in order to explain its use and operation in conjunction with the electrical connections, circuits, and apparatus illustrated in the several diagrams before referred to.

In Fig. 1, 25, and 26, respectively, represent two locomotives, moving in common upon a block or section of track, 27, toward each other as shown by the arrows in said figure. For all intents and purposes such conventional illustration will serve to show two trains approaching each other within dangerous proximity upon a single track. In each locomotive-cab is an electric-battery, 28, a controlling pole-changing-switch, 29, and an annunciating or signal bell, 30. The minus pole of the battery is in circuit with the contact-plate, 2, of the switch by the conductor, 31, while the other opposite contact-plate, 3, is connected to the plus pole of the battery by the connection, 32. The contact-plate, 9, is in circuit with the bell, 30, by the conductor, 33; and the bell, in turn, is connected with the traveling contact-device, 34, by the wire, 35. The contact-plate, 10, of the switch is electrically connected to the ground through the wheels and truck of the locomotive (not shown) by the intermediate branch, 36. In this case, the ground is formed by the continuous track-rails. The block or section is made by the sectional overlapping double insulated conductors laid in the center of the roadbed between the tracks in the manner and for the purpose set forth in my prior patent. The traveling contact, 34, makes electrical connection with such sectional conductors, 37, as the locomotives move along the track rails, 38, in a way well known to those skilled in this art. The short circuit contact-plate, 11, of the switch is connected to the contact device by a shunt-branch, 39, running from said plate to the connection, 35, and thus short-circuiting the bell. The permanent electrical connections just described are exactly similar in each cab of the locomotives, 25 and 26.

As shown in this view, the lever of the switch, in the cab, 25, is in a position at right angles to that of the lever of the switch in the cab, 26, so that both batteries are cut into the signaling circuit to work in unison, as is well understood. The position in which the respective switch-levers are placed are the normal positions occupied by them when the locomotive of each is moving; that is to say, the engineer of the locomotive proceeding north, for instance, sets his switch-lever in a position opposite to that occupied by the switch-lever of the train going south. Furthermore, where two trains are traveling in the same direction, the first train has its switch-lever in a reverse position to that of the switch-lever of the following train or section. The instant two trains enter upon a common block, the bell in each engine cab begins to ring and continues ringing as long as the two trains remain thereon. By this means, both engineers are notified to resort to precautions for safety in accordance with special rules governing the operation of that particular railway system. As before stated, Fig. 1, represents such a condition, and in that case the circuit traversed by the current from the battery in engine, 26, is as follows:—conductor, 31, contact-plate, 2, bridge-contact, 18, contact-plate, 9, connection, 33, bell-magnet-helices, wire, 35, contact-device, 34, sectional-track-conductors, 37, contact-device, 34, of engine, 25, conductor, 35, bell, 30, connection, 33, contact-plate, 9, bridge-contact, 18, contact-plate, 2, conductor, 31, battery, 28, conductor, 32, contact-plate, 3, bridge-contact, 17, contact-plate, 10, conductor, 36, track-rails, 38, conductor, 36, of engine 25, contact-plate, 10, bridge-contact, 17, contact-plate, 3, and conductor, 32, back to the battery, 28.

In Fig. 2, substantially the same arrangement and construction is illustrated with the exception that there are two trains 25 and 26 traveling in the same direction on a common block. The operation is identically the same and the electrical connections are also the same as illustrated in Fig. 1.

In Fig. 3, I have shown two trains on a common block or section, the train, 25, being understood as standing still while the other train, 26, is approaching. In this case, the switch-lever of the former is thrown to the position shown which short circuits the battery and bell of the train, 25, and completes the circuit through train, 25, so that as soon as the train 26 enters the block its battery will sound its own bell without signaling the other engineer. Should, however, the engineer of the stationary train decide to start, he must, according to rule, set his switch in the position the switch of train, 25, is set in Fig. 1, and immediately upon so doing, the bell in train 25 rings notifying him of the proximity of the other train.

It is not deemed necessary to trace the circuits in detail as regards Fig. 3, since they are apparent at a glance when once familiar with the connections illustrated in Fig. 1.

In Fig. 4, I have illustrated at the end of a track block or section, a station, 40, equipped with an electric battery, 41, signal-bell, 42, controlling-switch, 43, and signal-key, 44. Opposite said station is a side-track, 45, for the purpose of permitting trains going in opposite directions to pass at that point. The station-switch, 43, is similar in all respects to the switch, 29, before described, except that it is not provided with the short-circuit contacts. In other words, it is simply a pole-changing controlling switch. One pole of the battery, 41, is in circuit with the contact-plate, 9, of the switch by the connection, 45, while the other pole is connected to the bell, 42, by the conductor, 46. From the bell extends a connection, 47, to the contact-plate, 10. The circuit-controlling key 44 is in circuit with the sectional track conductors, 37, through the wire, 48, and intermediate branch, 49; and the wire, 48, also serves to place the contact-plate, 2, in electrical connection with the conductors, 37. The contact-point, 50, of the key is connected to one terminal of the bell by the conductor, 51, which latter is in circuit with the contact-plate, 3, by the shunt-loop or branch, 52, which, in turn, is connected to the ground-rails, 38, by the conductor, 53.

As shown, there is a train equipped and arranged similar to train, 26, in Fig. 1 approaching the station, 40, with the switch-lever thrown into position to receive a signal. The switch-lever in the station being in the position shown so that the batteries will work in unison, both the bells of the approaching engine and in the station will be simultaneously rung. Then, should the operator in the station desire to convey orders or other information by means of a pre-determined code of signals to the approaching engineer, he throws the switch-lever to the position shown in dotted lines, (which action cuts out his bell and battery,) and operates the circuit-closing key, 44. Thus, every time the circuit is closed by the key, 44, the bell in the engine, 26, is sounded.

It seems unnecessary to follow the circuits in accordance with the two above described operations since the path of the current can be readily understood from an inspection of the drawings.

It appears obvious that the electrical appliances in the station 40 might be duplicated so that like signals could be received and conveyed from trains coming from the opposite direction on the next adjacent block, or the electrical connections from the instruments in the station to the track and sectional conductors might be connected to both adjacent blocks so that the station operator could by his knowledge of the schedule and the corresponding alternate operation of his controlling switch-lever receive signals from trains coming in either direction from the same apparatus in the station.

Having thus fully and accurately described my invention, what I claim, and desire to secure by Letters Patent, is—

1. In a railway train signaling system of the class described, the combination with a suitable insulated section or block of the track comprising track-rails and an insulated sectional track circuit; of two or more locomotives severally equipped with a source of electricity, a traveling contact-device in electrical connection with the said track circuit, an annunciator, and a pole-changing controlling switch adapted to be operated to cut out the annunciator and battery in its locomotive and to complete the circuit through such locomotive for the battery current of the other locomotive on the same block or section; and suitable electrical connections, substantially as specified.

2. In a railway train signaling system of the class described, the combination with a suitably connected insulated block or section of track; of a locomotive traveling on said block or section and normally in electrical connection with the same; a source of electricity carried by said locomotive; an annunciator in circuit with said source of electricity; a pole-changing switch controlling said battery and capable of cutting out the annunciator and battery and establishing a complete circuit through said locomotive independent of the said battery and bell; another traveling vehicle included in the circuit and carrying a suitable source of electricity and annunciating apparatus and arranged to close the circuit through the locomotive when it enters a common block or section, and suitable electrical connections, substantially as specified.

3. In a railway signaling system of the class described, the combination with an insulated block or section of track suitably electrically connected with a station and with a traveling locomotive; of a locomotive provided with a source of electricity, an annunciator, suitable electrical connections, and a pole-changing switch capable of cutting out its battery and bell to complete an independent circuit through the locomotive; and a station equipped with a suitable source of electricity, an annunciator, a pole-changing switch, and a key included in a shunt loop; and suitable electrical connections, all arranged whereby reciprocal signaling is established between the said station and trains traveling in either direction toward the same, substantially as specified.

4. In a railway train signaling system of the class described, the combination with a controlling switch comprising a double set of pole-changing contacts adapted to be engaged by bridging contacts on the switch-lever and a set of short-circuit contacts also adapted to be bridged by the contacts of the switch-lever, of a source of electricity controlled by said switch, annunciating apparatus also controlled by said switch, and a circuit including another source of electricity and independent of the other source of electricity, substantially as specified.

In testimony whereof I affix my signature in presence of two witnesses.

BENJAMIN C. SEATON.

Witnesses:
WILLIAM S. BARKLEY,
FRANK T. EDENHARTER.